INVENTOR
MEYER MARKS
BY ATTORNEY [signature]

Sept. 19, 1950 M. MARKS 2,523,222

FREQUENCY MODULATION SYSTEM

Filed April 5, 1947 2 Sheets-Sheet 2

INVENTOR
MEYER MARKS
BY ATTORNEY

Patented Sept. 19, 1950

2,523,222

UNITED STATES PATENT OFFICE 2,523,222

FREQUENCY MODULATION SYSTEM

Meyer Marks, Chicago, Ill., assignor to Raytheon Manufacturing Company, Newton, Mass., a corporation of Delaware Application April 5, 1947, Serial No. 739,625

17 Claims. (Cl. 332—22)

The present invention relates to frequency modulation radio transmission systems, and more particularly to such a system which employs a novel phase shift modulator.

It is an object of the invention to improve the overall performance of frequency modulation transmitters.

It is another object of the invention to improve the signal-to-noise ratio of frequency modulation transmitters, and to minimize distortion.

It is another object of the invention to provide such improved frequency modulation transmitters which have direct crystal control of the carrier frequency.

It is still another object of the invention to accomplish the task of phase modulation with a minimum of inherent amplitude modulation.

It is a further object of the invention to provide a novel phase shift modulator for frequency modulation transmitters which permits the use of a relatively low order of frequency multiplication to arrive at the operating radio frequency with full modulation, and which does not require the employment of heterodyne frequency converters.

It is a still further object to provide such a modulator which has a reliable and straightfoward circuit, is simple to adjust and easy to maintain, which employs no costly special purpose tubes or complicated automatic frequency control circuits, and is designed and constructed with a minimum of complexity.

The foregoing and other and further objects and features of the invention will be appreciated from the following description of an illustratory embodiment thereof, reference being had to the accompanying drawings, wherein.

Figure 1:
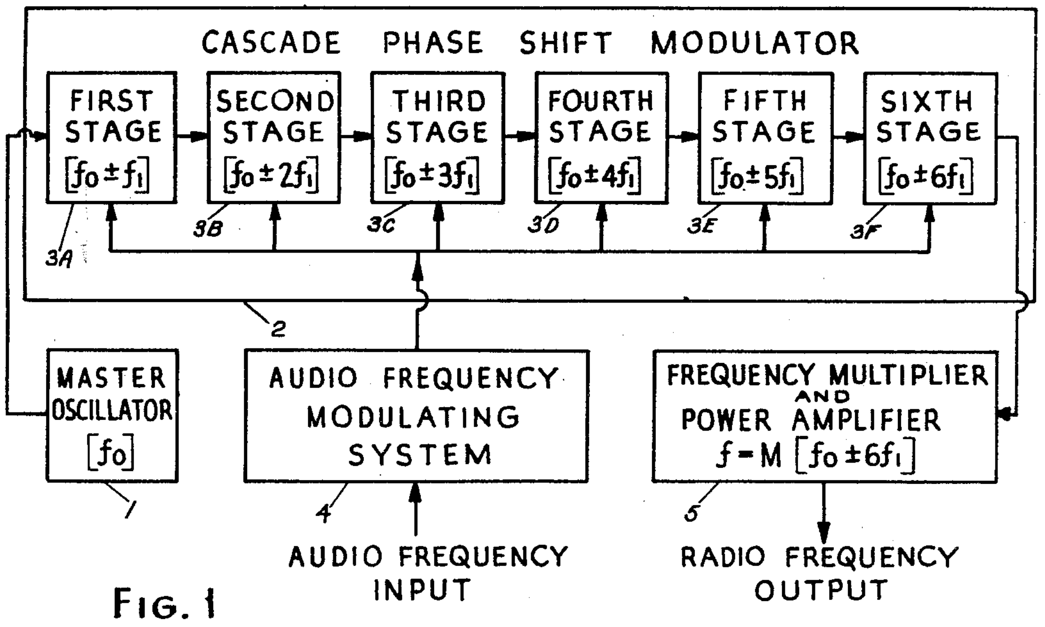
Fig. 1 is a block diagram of a new frequency modulation transmission system employing a novel phase shift modulator in accordance with the invention.

Referring now to Fig. 1, a master oscillator 1, which is preferably a crystal controlled oscillator, is designed to oscillate at a predetermined radio frequency, $f_0$, which may be 100 k. c. Audio frequency signals bearing the intelligence that is to be transmitted are brought to an audio frequency modulating system 4, wherein these signals are simplified or treated in any desired manner for the purposes of the system as a whole. The output signals of both the master oscillator and the audio frequency modulating system are brought independently to a cascade phase shift modulator 2.

This modulator has six phase shift stages 3A, 3B, 3C, 3D, 3E, and 3F which operate successively upon the master oscillator signal, all under the simultaneous control of the audio frequency signal. The master oscillator signal is fed into the first stage 3A of the phase shift modulator, and then from the first stage to the second stage 3B, and so on until the sixth stage 3F, from which the audio frequency modulated master oscillator signal emerges and is fed into frequency multiplier and power amplifier equipment 5. The audio frequency signal is applied simultaneously to each of the six phase shift stages of the phase shift modulator 2, and at each stage causes the master oscillator signal to deviate in frequency by an amount, $\pm f_1$, which is substantially the same regardless of the modulating frequency. Thus the output signal from the first stage 3A has a frequency which is $f_0 \pm f_1$, while in the second stage 3B an additional deviation equal to $\pm f_1$ is added, so that the output of the second stage has a frequency which is $f_0 \pm 2f_1$. This process continues through the successive stages of the phase shift modulator 2 so that the output of the sixth stage 3f has a frequency which is $f_0 \pm 6f_1$. The master oscillator, or carrier, frequency is not changed, but the amount of frequency deviation about the carrier frequency is progressively increased in substantially equal amounts in cascade fashion in each successive stage, so that the final output signal has a relatively large frequency deviation equal to $\pm 6f_1$.

The deviation, $\pm f_1$, in each phase shift stage is preferably maintained at a small enough value for all audio modulating frequencies to avoid harmonic distortion at the desired depth of modulation, while the final deviation, $\pm 6f_1$, of the cascade phase shift modulator 2 is sufficiently great to permit the employment of a frequency multiplier 5 having a relatively low multiplication factor M, and to render the use of heterodyne frequency converters unnecessary. The frequency multiplier 5 multiplies the output $f_0 \pm 6f_1$ by the multiplication factor M to yield the final radio frequency signal $M(f_0 \pm 6f_1)$, wherein the center frequency is $Mf_0$ and the frequency deviation is $M6f_1$.

In a practical system, the various frequencies employed may be as follows:

$f_0$=100 kilocycles/second.
$f_1$=12.86 cycles/second for 100% modulation.
M=972.

These values yield a transmitted radio frequency of 97.2 megacycles modulated at very close to ±75 kilocycles.

The phase shift in degrees that is required to provide a frequency shift $f_1$=12.86 cycles per second may be found from the relation $$f_1=\frac{f_a \cdot \phi}{57.3} \qquad \text{Relation (1)}$$

where:

$f_a$ is the modulating audio frequency,
$\phi$ is the phase shift in degrees, and
57.3 is the number of degrees per radian.

At an audio frequency of 30 cycles per second, $$12.86=\frac{30\phi}{57.3}$$

whence $$\phi=24.56 \text{ degrees}$$

It is known that it is possible to obtain a phase shift of about 25 degrees or less, in conventional phase modulator circuits, with low distortion, and from relation (1) it appears that as $f_a$ increases in value above 30 cycles per second, $\phi$ can become progressively smaller to provide a constant value $f_1$=12.86 cycles per second. If $\phi$ were 25 degrees at an audio frequency of 30 cycles per second from the modulator, $f_1$ would be 13.1 cycles per second, so that a value of 12.86 cycles per second for $f_1$ is well within acceptable limits. However in some cases it might be possible to use a frequency deviation of up to about 17.5 cycles per second. The value of $\phi$ is adjusted to provide a constant value of $f_1$ for all audio frequencies for the same degree of modulation through the employment of an inverse frequency network in the audio frequency modulating system, as will be explained below. Thus, with the choice of $f_1$=12.86 cycles per second for full, or 100%, modulation, in each stage of the cascade phase shift modulator 2, an overall phase shift of 77.16 cycles per second for a six stage modulator is had with practically no distortion. The multiplication factor M required to provide 75,000 cycle sidebands in the final output is then $$\frac{75{,}000}{77.16}=972$$

With a master oscillator frequency of 100 kc., this multiplication factor yields a final transmitted carrier frequency of 97.2 mc. The initial master oscillator frequency can be varied as desired to provide any desired final carrier frequency.

The advantages of the system of the invention just described are many. There are advantages realized from the use of a low multiplication factor M. A single stage of the present phase shift modulator 2 would require a multiplication factor of $$\frac{75{,}000}{12.86}=5832$$

to arrive at a transmitted signal having 75 kc. frequency deviation at full modulation. The lowest usable crystal frequency is about 75 kc. (the fifth harmonic of the highest audio frequency of 15 kc.). Then in order to obtain transmission of a carrier frequency of 97.2 mc., a multiplication factor M of 1296 is the highest that can be used, unless a heterodyne frequency converter is employed. Such converters are undesirable, as they introduce spurious beat frequencies which must be discriminated against by means of special tuned circuits and shielding. Further, additional spurious beat signals may be introduced from the low frequency stages into the broad pass bands of stages following the converter. With the system of the invention, however, six phase shift stages (3A to 3F inclusive) each operated at less than the allowable phase shift of 25 degrees, provide a total frequency change equal to 6×12.86=77.16 cycles per second. As shown, this frequency change requires only a multiplication factor M equal to 972 to provide 75 kc. deviation. A crystal controlled oscillator 1 operating at 100 kc. can be used with this system. No heterodyne frequency converter is required.

The present invention also contributes greatly to the reduction of noise signals. Random noise voltages in the tubes of the phase shift stages 3A to 3F, inclusive, are effective to cause spurious phase shifting of the unmodulated carrier wave in all frequencies, and these spurious phase shifts are increasingly noticeable toward the high audio frequencies because there is no inverse frequency attenuation of them. It has been found that these random noise voltages are reduced with respect to intelligence signals when the multiplication factor M is made smaller. Further, when a plurality of modulator stages 3A to 3F, inclusive, are added in cascade, as taught herein, the signal to noise ratio is further improved. The random nature of the noise voltages produced in the individual modulator stages makes it necessary to take the "R. M. S." sum of these voltages in order to find the resultant noise voltage at the output terminals of the modulator 2, whereas the intelligence signal phase shift appearing at these terminals is equal to the sum of the phase shifts produced in the individual stages. Thus, for six stages, the total noise is multiplied by $\sqrt{6}$, while the total intelligence signal is multiplied by 6, yielding an improvement in the signal-to-noise ratio in the ratio $6/\sqrt{6}=\sqrt{6}=2.5$ (approximately).

Figure 2:
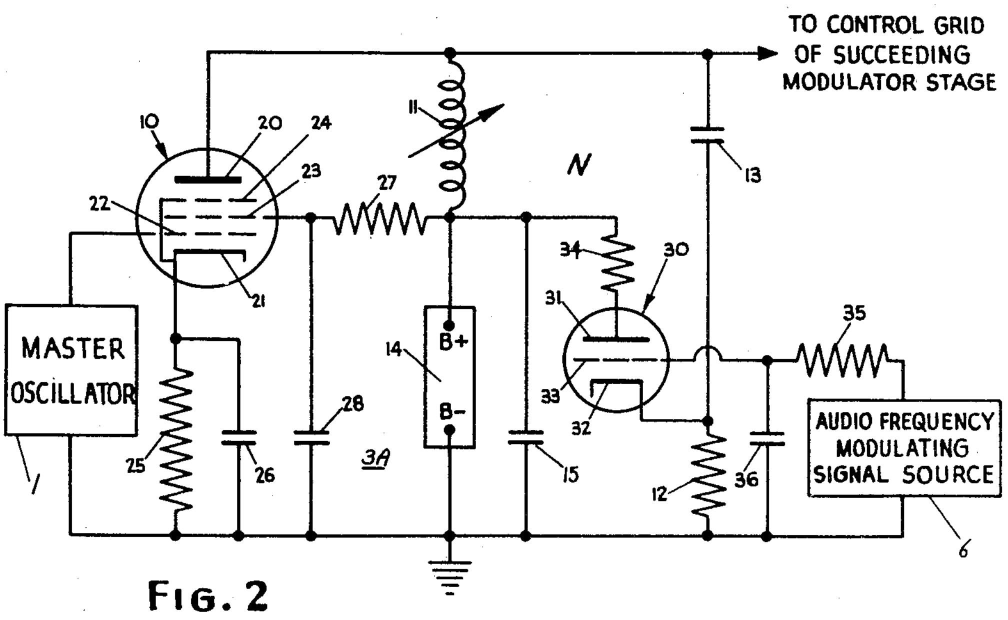
Fig. 2 is a circuit diagram of the first stage of the modulator.

The individual phase shift stages 3A to 3F, inclusive, are substantially identical. A single stage 3A, the first, is illustrated in Fig. 2. The circuit comprises basically an amplifier tube 10 and as the plate load impedance therefor, a network N, made up essentially of an inductor 11, which may be variable, and, in parallel therewith as far as radio frequency currents are concerned, a resistor 12 and a capacitor 13 connected in series with each other. The tube 10 serves both as an amplifier which isolates adjacent cascade phase shift stages one from the other and as a source of constant current for the network N, to which end the tube is preferably a pentode having an anode 20, a cathode 21, a control grid 22, a screen grid 23, and a suppressor grid 24. A source of plate voltage and current 14 is connected at its positive terminal to the anode 20 through the inductor 11, and at its negative terminal to the cathode 21 through a biasing resistor 25, and to ground. A radio frequency by-pass capacitor 26 is connected in parallel with the biasing resistor 25. The screen grid 23 is connected to the aforementioned positive terminal of the plate voltage source 14 through a current limiting resistor 27, and to ground through a second radio frequency by-pass capacitor 28. A third radio frequency by-pass capacitor 15, connected in parallel with the voltage source 14, effectively connects the lower end of the inductor 11 to ground and to the lower end of the network resistor 12 for radio frequency signals.

As will be explained below, the impedance Z of the network N is substantially constant in magnitude regardless of the resistance value of the resistor 12, a condition that is obtained when the reactance $X_L$ of the inductor 11 is adjusted to be substantially twice as great in magnitude as the reactance $X_C$ of the capacitor 13 at the frequency of the master oscillator 1. However, variations in the effective value of the network resistor 12 cause the network N to become capacitive or inductive, depending on the direction of the variation, so that the phase of the output voltage to the control grid 22 of the next succeeding modulator stage 3B may be shifted, with respect to the plate current as a reference, as much as 90 degrees in either direction. The voltage that is amplified and phase shifted in the tube 10 is furnished by the master oscillator 1 to the control grid 22 and, as stated above, may be a radio frequency voltage at 100 kc. As will be recalled, the amount of phase shift that is applied in any single phase shift stage is preferably maintained at or below ±25 degrees.

The value of resistance appearing across the resistor 12 is effectively varied through the medium of a resistance tube circuit, employing a second electron discharge tube 30, which translates audio frequency voltage variations from the audio frequency modulating signal source 6 into corresponding network resistance variations. This second tube may be a triode, having an anode 31, a cathode 32, and a control grid 33, and is connected at its anode to the positive terminal of the voltage source 14 through a plate circuit resistor 34, and at its cathode to the junction point between the network capacitor 13 and resistor 12. Audio frequency modulating voltages are applied at the control grid through a grid circuit resistor 35. The grid is connected to ground through a capacitor 36. The grid resistor 35 and grid-to-ground capacitor 36 form an inverse frequency network which progressively attenuates the higher audio frequencies at the grid 33 by by-passing more and more of the audio frequency input signal to ground as the audio frequency increases. As stated above, an inverse frequency network is customarily employed with phase shift circuits in order that all audio frequencies will cause the same frequency deviation for the same degree of modulation.

Six phase shift stages 3A to 3F, inclusive, are arranged in cascade-fashion as follows:

Each phase shift stage has power connections, one at ground and one at the junction between the pentode plate load inductor 11 and the triode plate load resistor 34, for a plate voltage source 14, and in a practical system a single voltage source may be connected to all six stages in parallel. In addition, each phase shift stage has a resistance tube 30 with a control grid 33. The audio frequency modulating system 4 of Fig. 1 contains within it an inverse frequency network, such as the resistor 35 and capacitor 36, and the audio frequency voltage developed across the capacitor is applied between ground and all the grids 33 in parallel. Finally, the radio frequency signal from the master oscillator 1 is transmitted from the pentode output of the first stage 3A to the pentode control grid 22 of the second stage 3B, and so on from each pentode to the next succeeding pentode until the final modulated radio frequency signal, $f_0 \pm 6f_1$, emerges from the pentode output of the sixth stage 3F.

Figures 3, 4:
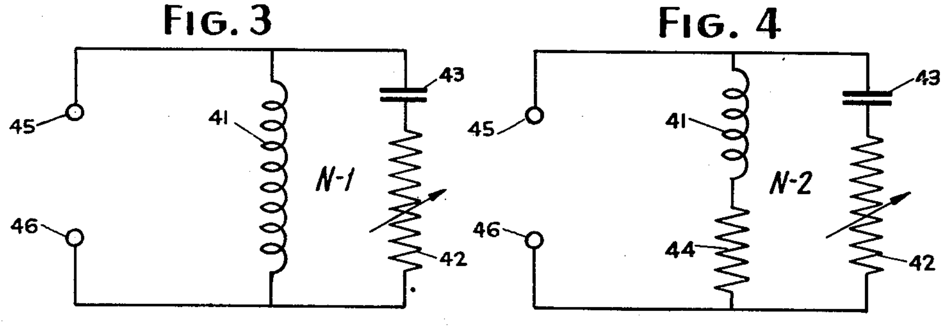
Figs. 3 and 4 are respectively schematic diagrams of a constant impedance network.
Figure 5:
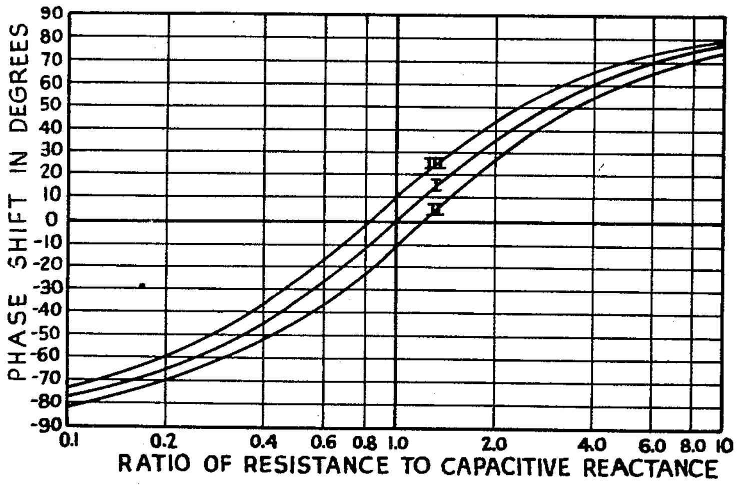
Fig. 5 is a graph showing certain phase shift characteristics of the network as shown in Fig. 4.

For an understanding of the operation of the circuit shown in Fig. 2, reference is now had to Figs. 3, 4, and 5. In Fig. 3, the network N of Fig. 2 is redrawn as a network N–1 composed essentially of an inductor 41 connected in parallel with a capacitor 43 and variable resistor 42 in series with each other. The network is furnished with two terminals 45 and 46 for the application thereto of the radio frequency voltage that is to be operated upon. The impedance Z of the network N–1 is expressed mathematically as follows:

$$Z=\frac{jX_L(R-jX_C)}{R+j(X_L-X_C)}\qquad \text{Relation (2)}$$

where:

$X_L$ is the reactance of the inductor 41,
$X_C$ is the reactance of the capacitor 43,
R is the resistance of the resistor 42, and
$j$ is the imaginary, $\sqrt{-1}$.

From relation (2) it can be shown that the magnitude of the network impedance Z is:

$$|Z|=X_L\sqrt{\frac{1+\left(\frac{X_C}{R}\right)^2}{1+\left(\frac{X_L-X_C}{R}\right)^2}}\qquad \text{Relation (3)}$$

Now, in relation (3), make the following substitutions:

$$a=\frac{X_C}{X_L}\qquad \text{Relation (4)}$$

$$b=\frac{R}{X_C}\qquad \text{Relation (5)}$$

Relation (3) may now be transformed to appear as follows:

$$|Z|=X_L\sqrt{\frac{1+\left(\frac{1}{b}\right)^2}{1+\left(\frac{1}{b}\right)^2\left(\frac{1}{a}-1\right)^2}}\qquad \text{Relation (6)}$$

A study of relation (6) shows that when the quantity $$\left(\frac{1}{a}-1\right)$$

is set equal to unity, viz:

$$\frac{1}{a}-1=1\qquad \text{Relation (7)}$$

the quantity under the radical sign is also equal to unity, and therefore |Z| remains constant and equal to $X_L$ regardless of any variation in "$b$." From relation (7), this condition occurs when "$a$" is set equal to 0.5. Substituting this solution back in relation (4), it follows that |Z| is constant when $$X_L=2X_C\qquad \text{Relation (8)}$$

Therefore, in the network N–1 the inductance of the inductor 41 and the capacitance of the capacitor 43 are so related to each other that, for a given operating frequency, the inductive reactance is substantially twice as great as the capacitive reactance, in order that the network shall have constant impedance. In the network N of Fig. 2, this adjustment is made by varying the magnitude of the inductance of the inductor 11.

When network N is so adjusted, the resonance frequency thereof is equal to $$\frac{1}{\sqrt{2}}$$

times the master oscillator frequency, as follows:

From relation (8)

$$\omega L=\frac{2}{\omega C}$$

whence:

$$\omega^2=\frac{2}{LC}=(2\pi f_0)^2$$

therefore:

$$f_0=\frac{\sqrt{2}}{2\pi\sqrt{LC}}$$

But, the resonance frequency, $f_r$, is:

$$f_r=\frac{1}{2\pi\sqrt{LC}}$$

so that:

$$f_0=\sqrt{2}f_r$$

or $$f_r=\frac{f_0}{\sqrt{2}}$$

It should be noted that the network N in Fig. 2 is used as the radio frequency plate load of a tube 10, the plate resistance of which is ordinarily over one hundred times as great as |Z| of the network. Also, the inductor 11 is ordinarily a coil of high Q, for example about 50, so that the parallel resistance thereof is likewise comparatively high, so that the effect of these two quantities on the magnitude of Z for the network N may be neglected.

The above-mentioned additional, relatively high, resistance components do, however, have a small effect in determining the phase angle of the network N. In Fig. 4, the network has again been redrawn as a network N–2 having, as an additional component of resistance, a resistor 44 connected in series with the inductor 41. The network N–2 is otherwise the same as network N–1 of Fig. 3. The impedance Z of network N–2 is:

$$Z=\frac{(R_1+jX_L)(R_2-jX_C)}{R_1+R_2+j(X_L-X_C)}\qquad \text{Relation (9)}$$

where:

$R_1$ is the resistance of resistor 44, and
$R_2$ is the resistance of resistor 42.

Now, let:

$$Z=R'+jX'\qquad \text{Relation (10)}$$

and $$\tan\theta=\frac{X'}{R'}\qquad \text{Relation (11)}$$

where $\theta$ is the phase angle of the network N–2.

Then, it can be shown that:

$$R'=\frac{R_1^2R_2+R_1R_2^2+R_2X_L^2+R_1X_C^2}{(R_1+R_2)^2+(X_L-X_C)^2}$$

and $$X'=\frac{R_2^2X_L-R_1^2X_C-X_L^2X_C+X_LX_C^2}{(R_1+R_2)^2+(X_L-X_C)^2}$$

whence:

$$\tan\theta=\frac{R_2^2X_L-R_1^2X_C-X_L^2X_C+X_LX_C^2}{R_1^2R_2+R_1R_2^2+R_2X_L^2+R_1X_C^2}\qquad \text{Relation (12)}$$

Recall relationships (4) and (5), remembering that R of relationship (5) is now $R_2$, and recall also that the Q of the inductor 41 is given by:

$$Q=\frac{X_L}{R_1}\qquad \text{Relation (13)}$$

Substituting relations (4), (5), and (13) in relation (12), it appears that:

$$\tan\theta=\frac{a(b^2+1)-\left[1+\left(\frac{1}{Q}\right)^2\right]}{\frac{a}{Q}(b^2+1)+b\left[1+\left(\frac{1}{Q}\right)^2\right]}$$

Where Q is greater than 10, $$\left(\frac{1}{Q}\right)^2$$

is negligibly smaller than unity, so that:

$$\tan\theta=\frac{(b^2+1)-\frac{1}{a}}{\frac{1}{Q}(b^2+1)+\frac{b}{a}}\qquad \text{Relation (14)}$$

Fig. 5 shows a plot of the phase angle $\theta$ (in terms of the phase shift in degrees in the network N–2) against "b" (the ratio of $R_2/X_C$), derived by substituting discrete values for "a" and "b" in relation (14). The Q of the inductor 41 was taken as 30, and curves I, II, and III were plotted for "a" equal to 0.5 (the constant impedance solution), 0.4, and 0.6, respectively. When it is recalled that only the resistance component $R_2$ of "b" can be varied, it is apparent that variations in resistance of the resistor 42 in network N–2 are responsible for the phase shift in the network. It should be recalled that for low distortion in any single phase shift stage, the phase angle $\theta$ does not become greater than 25 degrees in either direction. The curves I, II, and III do not have pronounced curvature in this region, whence it appears that the adjustment to render $X_L=2X_C$ is not highly critical.

A mental picture of the phase shift action to which the output voltage in the circuit of Fig. 3 is subjected may now be obtained by considering the two extremes of resistance of the resistor 42, bearing in mind that the inductive reactance is equal to twice the capacitive reactance (relation (8)). For resistor 42 open circuited, the current through the network N–1 must be inductive, and the output voltage leads the plate current by approximately 90 degrees. When resistor 42 is short circuited, the current taken by the capacitive branch of network N–1 is twice as great as that taken by the inductive branch, thus making the net current through the network N–1 capacitive. The output voltage then lags behind the plate current by approximately 90 degrees. Intermediate resistance values of the resistor 42 result in phase angles $\theta$ as predicted by a curve like those shown in Fig. 5.

In Fig. 2, the effective resistance appearing across resistor 12 in the network N is varied in accordance with the audio frequency modulating signal by the modulator or resistance tube 30. This tube replaces the variable resistor 42 shown in the circuits of Figs. 3 and 4. The resistance tube works as follows:

Taking the point of view of the audio frequency modulating signal, the resistance tube circuit behaves somewhat like a cathode follower. The anode 31 is by-passed to ground through the aforementioned third by-pass capacitor 15; the audio frequency signal is applied between the control grid 33 and ground, across the shunt capacitor 36 of the inverse frequency network; and an "amplified" output voltage (the gain is less than one in a cathode follower) appears between the cathode and ground. For this condition of operation the resistance looking into the end terminals of the resistor element 12 from the rest of the network N may be given as:

$$R=\frac{1}{\frac{1}{R_k}+\frac{1}{R_p}+\frac{\mu}{R_p}} \qquad \text{Relation (15)}$$

where:

$R_k$ is the resistance of the resistor 12, $R_p$ is the effective plate resistance of the tube 30 at its operating point, and $\mu$ is the amplification factor of the tube 30 at its operating point.

Taking now the point of view of the radio frequency voltage, which, it will be remembered, is the voltage across the constant impedance Z of the network N, and assuming for the moment that the audio frequency modulating signal is equal to zero, the circuit now behaves rather like a grounded grid amplifier. This is so because the inverse frequency network capacitor 36, being large enough to pass the higher audio frequency signals to some extent, effectively puts the grid 33 at ground potential for radio frequencies. Thus, any radio frequency voltage that exists between the cathode 32 and ground is also applied between the control grid 33 and the cathode 32. Under normal conditions of operation, the relatively high value of the resistor 12 never allows grid current to flow during the positive portion of the radio frequency cycle. However, if the radio frequency grid-to-cathode voltage is high enough, the tube 30 is cut off during some part of the radio frequency cycle, the point of cut-off being a definite function of the instantaneous grid to cathode voltage and the plate to cathode voltage.

It is thus seen that the function of the modulating audio frequency signal is to determine the fraction of the radio frequency cycle during which the plate current flows through the resistance tube 30. Expressed another way, during the time the audio frequency modulating signal is positive on the grid 33, the output voltage phase angle attendant upon such current flow is increased, and during the balance of the modulating signal cycle, the reverse is true. During the part of the radio frequency cycle over which the tube 30 is cut off, the resistance R of relation (15) is equal in magnitude to $R_k$ (which is the resistance of the resistor 12), and for the remainder of the radio frequency cycle, R has the magnitude defined by relation (15).

The above-described resistance tube circuit has proved superior to vacuum tube circuits employing the dynamic plate resistance of a tube as a function of control grid voltage to provide a variable resistor. To obtain low distortion, the characteristic of resistance versus control voltage of this device must be made to approximate the curvature of the phase angle characteristic (Fig. 5). This requirement is particularly important for low frequency modulating signals in the band from 30 to 50 cycles per second, where a maximum phase shift of about ±25 degrees per phase shift stage is required for full frequency deviation. In the above-mentioned dynamic plate resistance circuits, the adjustment of bias voltages becomes critical and thus presents difficulties in practical use when this requirement of curve matching must be met; but, with the resistance tube circuit of the invention, no bias adjustment at all is necessary. It has been found possible to change the curvature of the resistance tube characteristic over a range sufficient to match the curvature of curves like those of Fig. 5. This is accomplished in practice by the proper choice of the radio frequency voltage level and the value of the network resistor 12. Once these parameters are determined, the design of the modulator stage is fixed.

Figure 6:
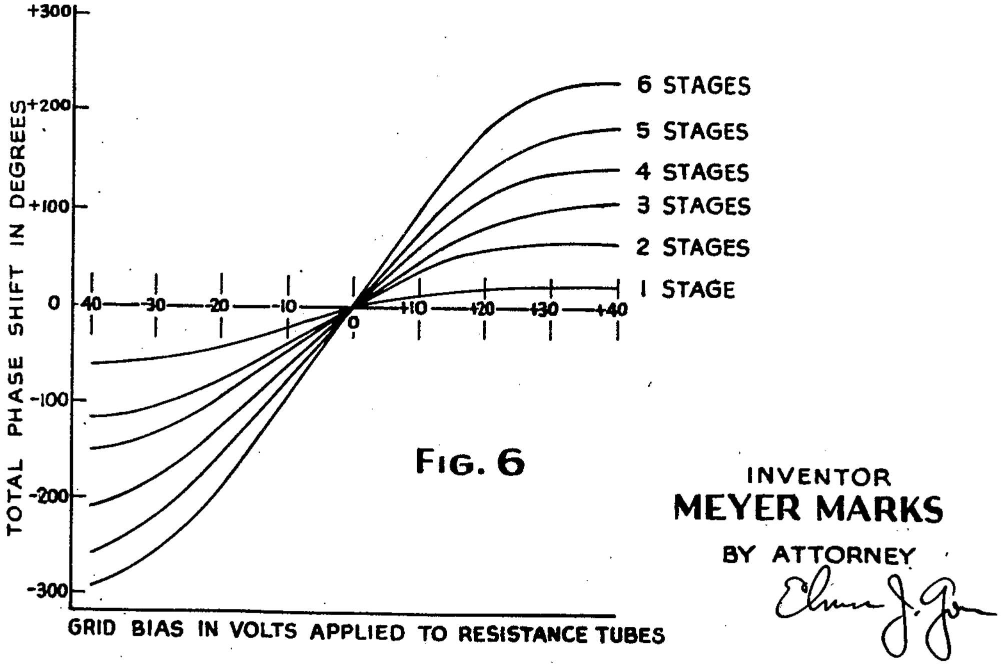
Fig. 6 is a graph showing the operating characteristics of a modulator in accordance with the invention.

A static characteristic curve, giving the total phase shift in degrees as a function of the grid bias applied to the resistance tubes 30 for 1, 2, 3, 4, 5, and 6 cascade stages, is shown in Fig. 6. The linearity of the curve for 6 stages is attested by the following harmonic distortion measurements:

Distortion for 75 kc. frequency deviation:
30 cycles per second (audio signal) ___ 1.25%
50 to 15,000 cycles per second __ less than 0.6%
Distortion for 100 kc. frequency deviation:
50 to 15,000 cycles per second __ less than 1.0%

Inasmuch as many variations and modifications of this invention will occur to those skilled in the art, it is desired that the appended claims shall be given a broad interpretation commensurate with the scope of the invention within the art.

What is claimed is:

1. A radio transmitting system comprising means for generating a carrier wave, means for generating a modulating signal, and means including a plurality of cascade connected electron tube relay stages, each having an input circuit and an output circuit, said carrier wave being provided to the first stage input circuit, means connected in common with each connecting output and input circuit for presenting substantially constant impedance to said carrier wave, and means for altering the electrical character of said last-named means between capacitive and inductive for impressing upon said carrier wave in succession a first frequency deviation in accordance with said signal, and additional frequency deviation in accordance with said signal.

2. A radio transmitting system comprising means for generating a carrier wave, means for generating a modulating signal, means including a plurality of cascade connected electron tube relay stages, each having an input circuit and an output circuit, said carrier wave being provided to the first stage input circuit, means connected in common with each connecting output and input circuit for presenting substantially constant impedance to said carrier wave, and means for altering the electrical character of said last-named means between capacitive and inductive for impressing upon said carrier wave in succession a first frequency deviation in accordance with said signal, and additional frequency deviation in accordance with said signal, and means for multiplying both the frequency of said carrier wave and the final deviation.

3. A modulator for frequency modulation radio transmitters comprising a plurality of phase shift stages arranged to receive a carrier wave signal in the first stage and to transmit said signal successively from one stage to the next, means in each stage including means in the output of each stage for presenting substantially constant impedance to said carrier wave signal, means for altering the electrical character of said constant impedance means between capacitive and inductive for effecting a shift in phase of the voltage of said signal with respect to the current thereof in accordance with a modulating signal, and means for impressing a modulating signal simultaneously upon all of said last mentioned means.

4. A modulator for frequency modulation radio transmitters comprising six modulator stages arranged to receive a carrier wave signal in the first stage and to transmit said signal successively from one stage to the next, each of said stages including means in the output thereof for presenting substantially constant impedance to said carrier wave signal, means for altering the electrical character of said constant impedance means between capacitive and inductive adapted to impress a frequency deviation no greater than 17.5 cycles per second upon said carrier wave as it exists therein, in accordance with a modulating signal, and means for impressing a modulating signal simultaneously upon all of said stages.

5. Phase control means comprising a parallel resonance network having inductance in one branch and capacitance in another branch, and having resistance, and being resonant to a particular frequency, means for impressing an alternating voltage of another frequency which is substantially $\sqrt{2}$ times as great as said particular frequency across said network, and means for varying the magnitude of said resistance.

6. Phase control means comprising a network having an inductor and in parallel therewith a capacitor and a resistor connected together in series, the reactance of said inductor being substantially twice the reactance of said capacitor at a particular frequency, means for impressing an alternating voltage at said particular frequency across said network, and means for varying the resistance of said resistor.

7. Phase control means comprising a network having inductance, capacitance, and resistance, means for impressing an alternating voltage across said network, said inductance and capacitance being so dimensioned that said network presents a substantially constant impedance to said voltage regardless of the magnitude of said resistance, and a cathode follower device connected to include said resistance in its cathode circuit and effective to alter the electrical character of said network between inductive and capacitive in accordance with the conductivity of said device.

8. Phase control means comprising a network having an inductor, a capacitor, and a resistor, means for impressing an alternating voltage across said network, said inductor and capacitor being so dimensioned that said network presents a substantially constant impedance to said voltage regardless of the resistance of said resistor, an electron discharge device having at least an anode, a cathode, and a control electrode, connected at its cathode to one end of said resistor, and at its anode to a source of anode potential, and means for impressing a voltage between said control electrode and the other end of said resistor.

9. Phase control means comprising electron discharge means having an input circuit for oscillations of substantially fixed frequency and an output circuit, means in said output circuit for presenting substantially constant impedance to said frequency, and a cathode follower device for altering the electrical character of said last named means between capacitive and inductive in accordance with variations in the conductivity of said device.

10. Phase control means comprising electron discharge means having an input circuit for oscillations of substantially fixed frequency and an output circuit, a parallel resonance network in said output circuit having resistance and being tuned to be resonant at a frequency equal substantially to said fixed frequency divided by $\sqrt{2}$, and means for varying the magnitude of said resistance.

11. Phase control means comprising electron discharge means having an input circuit for oscillations of substantially fixed frequency and an output circuit, means in said output circuit for presenting substantially constant impedance to said frequency, and an electrically conductive device for altering the electrical character of said last-named means between capacitive and inductive in accordance with variations in the conductivity of said device.

12. Phase control means comprising electron discharge means having an input circuit for oscillations of substantially fixed frequency and an output circuit, means in said output circuit for presenting substantially constant impedance to said frequency, and means for altering the electrical character of said last-named means between capacitive and inductive.

13. Phase control means comprising first electron discharge means having a first input circuit for oscillations of substantially fixed frequency and a first output circuit, second electron discharge means having a second input circuit and a second output circuit, means in common in said first output circuit and second input circuit for presenting a substantially constant impedance to said frequency, and means for altering the electrical character of said last-named means between capacitive and inductive.

14. Phase control means comprising first electron discharge means having a first input circuit for oscillations of substantially fixed frequency and a first output circuit, second electron discharge means having a second input circuit and a second output circuit, parallel-connected inductive and capacitive elements connected in common in said first output circuit and said second input circuit, the inductive reactance being substantially twice the capacitive reactance in magnitude at said frequency, resistive means in circuit with one of said elements, and means for varying the resistance magnitude.

15. A radio transmitting system comprising means for generating a carrier wave, means for generating a modulating signal, an electronic relay having a carrier wave input circuit, an output circuit, and a modulation input circuit, means in said output circuit for presenting substantially constant impedance to said carrier wave, and resistance means in both said output circuit and said modulation input circuit adapted to be varied in effective magnitude in accordance with said modulating signal.

16. A radio transmitting system comprising means for generating a carrier wave, means for generating a modulating signal, a plurality of electronic relay stages each having a carrier wave input circuit, an output circuit, and a modulation input circuit, and having their carrier wave input and their output stages cascade connected, means in each output circuit for presenting substantially constant impedance to said carrier wave, resistance means in each output circuit, the modulation input circuit of each stage including the resistance means of said stage, and means in each modulation input circuit to vary the effective magnitude of each of said resistance means in accordance with said modulating signal.

17. A radio transmitting system comprising means for generating a carrier wave, means for generating a modulating signal, a plurality of electronic relay stages each having a carrier wave input circuit, an output circuit, and a modulation input circuit, and having their carrier wave input and their output stages cascade connected, means in each output circuit for presenting substantially constant impedance to said carrier wave, resistance means in each output circuit, the modulation input circuit of each stage including the resistance means of said stage, means to apply said modulating signal to all of said modulation input circuits in parallel, and means in each modulation input circuit to vary the effective magnitude of each of said resistance means in accordance with said modulating signal.

MEYER MARKS.

REFERENCES CITED

The following references are of record in the file of this patent:

UNITED STATES PATENTS

| Number | Name | Date |
|---|---|---|
| 1,950,759 | Terman | Mar. 13, 1934 |
| 2,143,386 | Roberts | Jan. 10, 1939 |
| 2,335,934 | Goldstine | Dec. 7, 1943 |
| 2,436,834 | Stodola | Mar. 2, 1948 |